(12) United States Patent
Huang (10) Patent No.: US 6,736,301 B1
(45) Date of Patent: May 18, 2004

(54) SUPPORT ASSEMBLY FOR CARRYING BICYCLES ON A VEHICLE

(76) Inventor: Chin-Sung Huang, No 152, Tsai-Liao Road, Pi-Chiao Village, Pu-Hsin County, Chang-Hua Hsiang (TW)

( * ) Notice: Subject to any disclaimer, the term of this patent is extended or adjusted under 35 U.S.C. 154(b) by 46 days.

(21) Appl. No.: 10/321,645

(22) Filed: Dec. 18, 2002

(51) Int. Cl.$^7$ .................................................. B60R 9/10
(52) U.S. Cl. ........................ 224/500; 224/513; 224/536; 224/924
(58) Field of Search ................................. 224/492, 500, 224/513, 531, 532, 536, 537, 924; 280/762, 769

(56) References Cited

U.S. PATENT DOCUMENTS

| | | | | |
|---|---|---|---|---|
| 4,815,638 A | * | 3/1989 | Hutyra | 224/532 |
| 5,495,970 A | * | 3/1996 | Pedrini | 224/924 |
| 5,690,259 A | * | 11/1997 | Montani | 224/924 |
| 5,947,357 A | * | 9/1999 | Surkin | 224/536 |
| 6,019,266 A | * | 2/2000 | Johnson | 224/537 |
| 6,047,869 A | * | 4/2000 | Chiu | 224/500 |
| 6,126,053 A | * | 10/2000 | Shaver | 224/532 |
| 6,491,195 B1 | * | 12/2002 | McLemore et al. | 224/537 |

* cited by examiner

*Primary Examiner*—Gary E. Elkins (57) ABSTRACT

A support assembly, which is mounted on a vehicle for carrying bicycles thereon, comprises a first frame member, a second frame member, two retractable tube sets, four front wheel seats and four rear wheel seats. The retractable tube sets pivot their ends on said first frame member and said second frame member respectively such that angles between said first frame member, said second frame member and said retractable tube sets and a distance between said first frame member and said second frame member can be adjusted to make the support assembly of the present invention can be mounted on any type of vehicle. The front wheel seats and the rear wheel seats are provided at the first frame member and said second frame member respectively to put and secure the bicycles' wheels thereon. The front wheel seats are rotatable so that the front wheels of the bicycles secured on the front wheel seats can be turned to shorten the lengths of the bicycles.

3 Claims, 15 Drawing Sheets

SUPPORT ASSEMBLY FOR CARRYING BICYCLES ON A VEHICLE

FIELD OF THE INVENTION

The present invention relates to a supplementary apparatus of vehicle, and more particularly to a support assembly which is mounted on a vehicle for carrying bicycles thereon.

Figure 1:
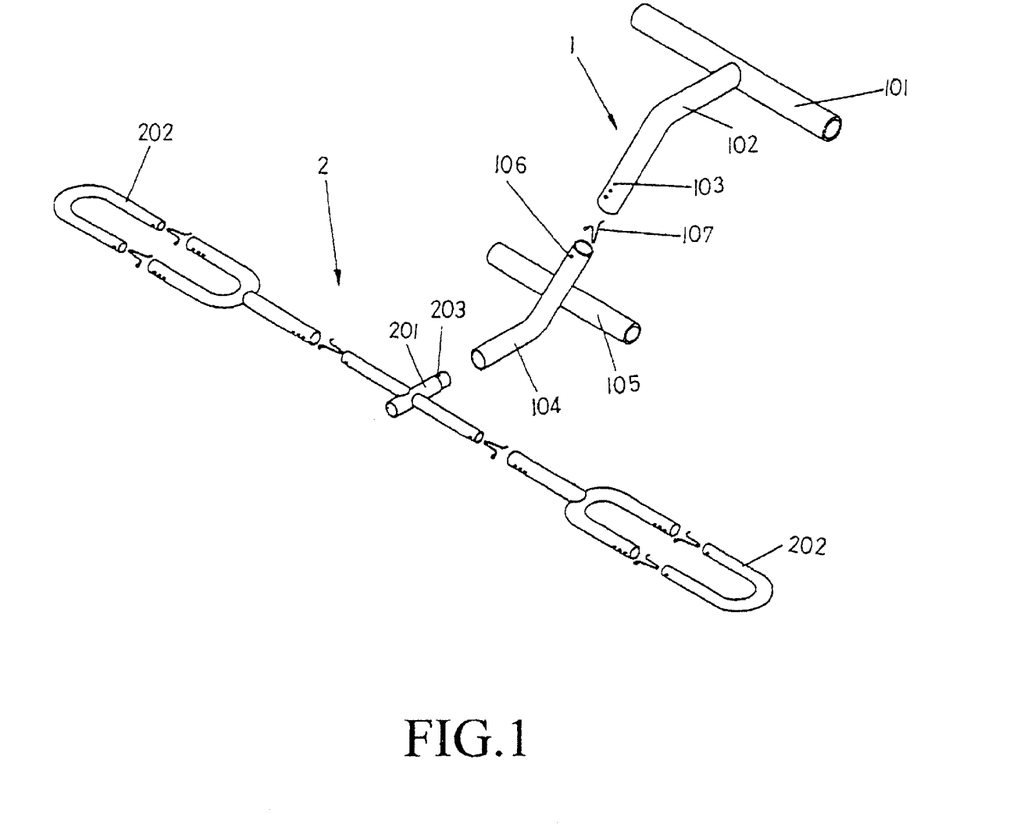
FIG. 1 is a perspective view of a conventional support frame.
Figure 2:
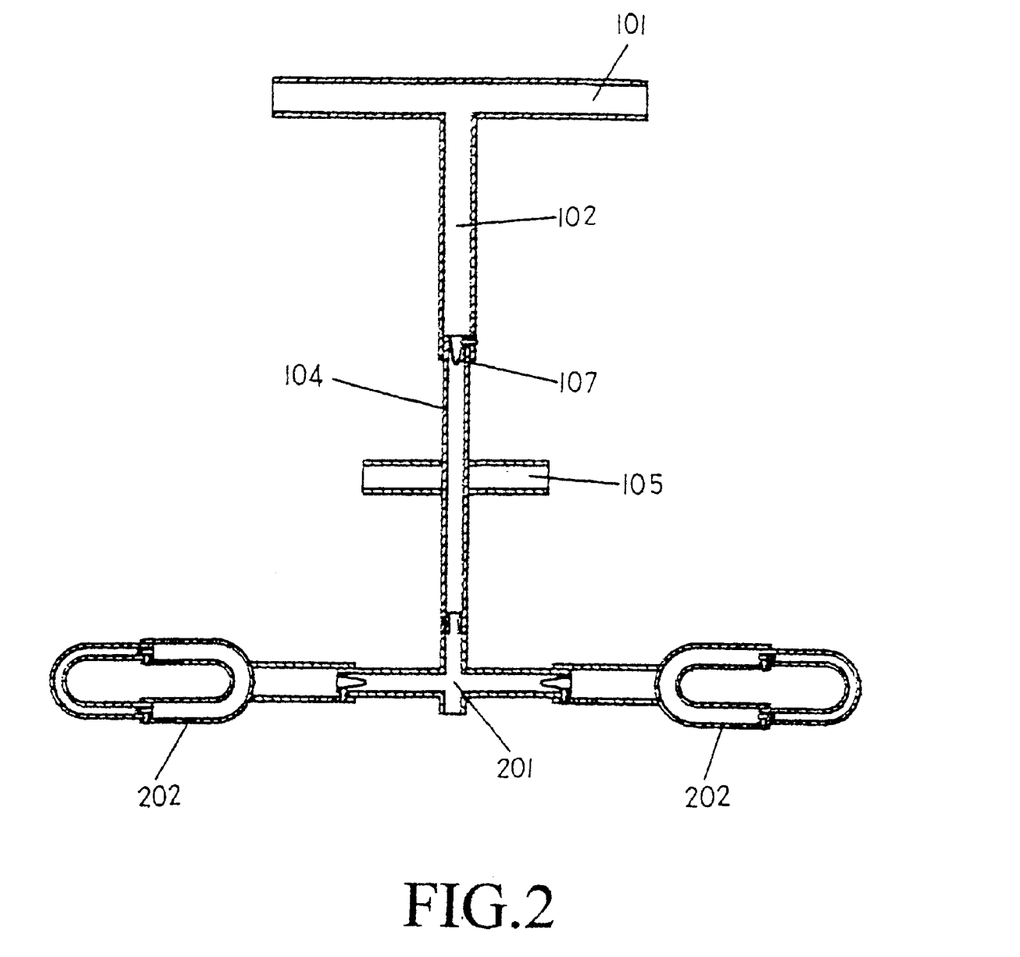
FIG. 2 is a sectional view of the conventional support frame.
Figure 3:
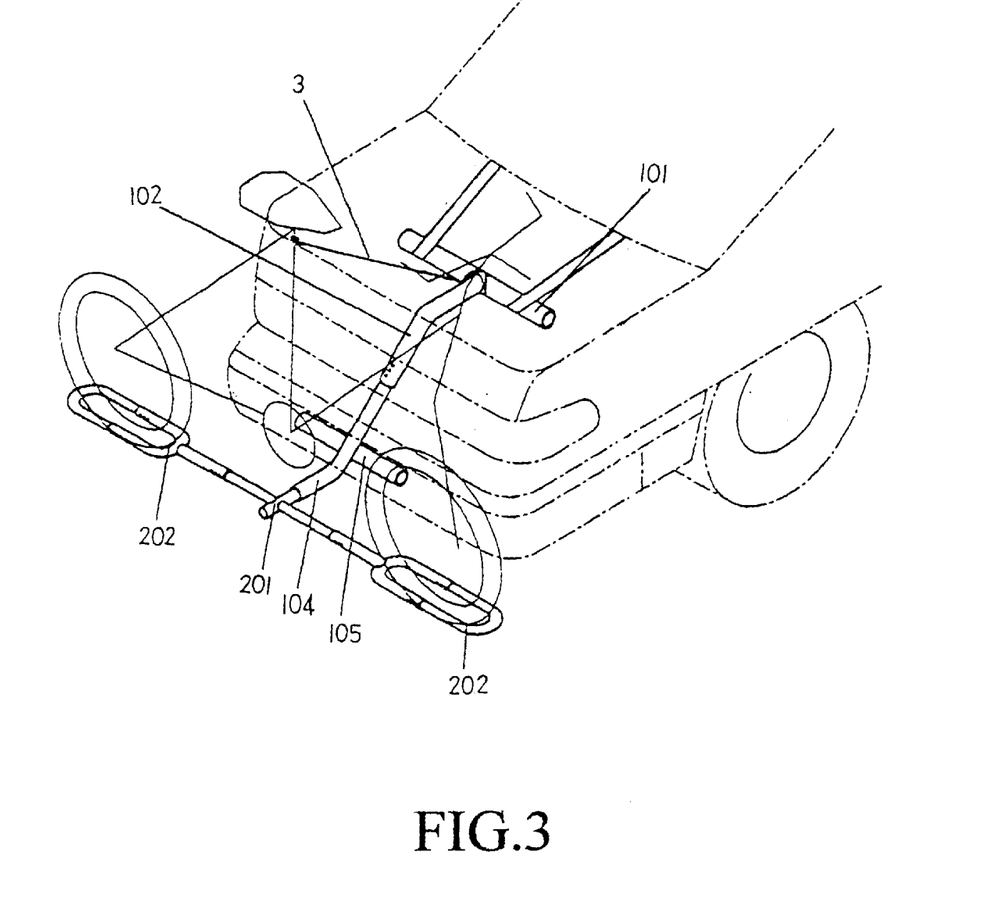
FIG. 3 is a perspective view, showing the conventional support frame mounted on a car and carrying bicycles thereon.

A conventional support frame for carrying bicycle on a car, please refer to FIGS. from FIG. 1 to FIG. 3, mainly comprises a main frame member 1 and a support frame member 2. The main frame member 1 consists of a main transverse tube 101, a retractable tube 102, a bottom tube 104 and a support tube 105. The retractable tube 102 has a plurality of apertures 103. The support tube 105 rests an end thereof against a rear bumper of the car. The bottom tube 104 has an aperture 106 at an end thereof for engagement with the retractable tube 102 by a spring 103 with a plug thereon. The support frame member 2 has a cross tube 201 which mounts two seat rings 202 at two opposite ends thereof respectively and a lock ball 203 on the third end thereof for locking the bottom tube 104. Such that combine the main frame member 1 with the support frame member 2 and mount them on the car to carrying a bicycle 3 thereon.

The bicycle 3 usually has a length larger than the width of the car such that the bicycle 3 will extrude out of the car from a side thereof. That will cause danger when driving the car with the bicycle 3 carried thereon. Furthermore, the conventional support frame only can be mounted on a normal four-door car rather than on a van or a car having a flow board at rear thereof.

SUMMARY OF THE INVENTION

The primary object of the present invention is to provide a support assembly for carrying bicycles on a vehicle, which can avoid the bicycles extruded out of the vehicle.

The secondary object of the present invention is to provide a support assembly, which can be mounted on any type of vehicle.

According to the objects of the present invention, a support assembly, which is mounted on a vehicle for carrying bicycles thereon, comprises a first frame member, a second frame member, two retractable tube sets, four front wheel seats and four rear wheel seats. The retractable tube sets pivot their ends on said first frame member and said second frame member respectively such that angles between said first frame member, said second frame member and said retractable tube sets and a distance between said first frame member and said second frame member can be adjusted to make the support assembly of the present invention can be mounted on any type of vehicle. The front wheel seats and the rear wheel seats are provided at the first frame member and said second frame member respectively to put and secure the bicycles' wheels thereon. The front wheel seats are rotatable so that the front wheels of the bicycles secured on the front wheel seats can be turned to shorten the lengths of the bicycles.

BRIEF DESCRIPTION OF THE DRAWINGS

FIGS. 4—4-1—4-2—4-3—4-4 is an exploded view of a first preferred embodiment of the present invention;

FIGS. 13—13-1—13-2 is an exploded view of a second preferred embodiment of the present invention;

DETAIL DESCRIPTION OF THE INVENTION

Figure 4:
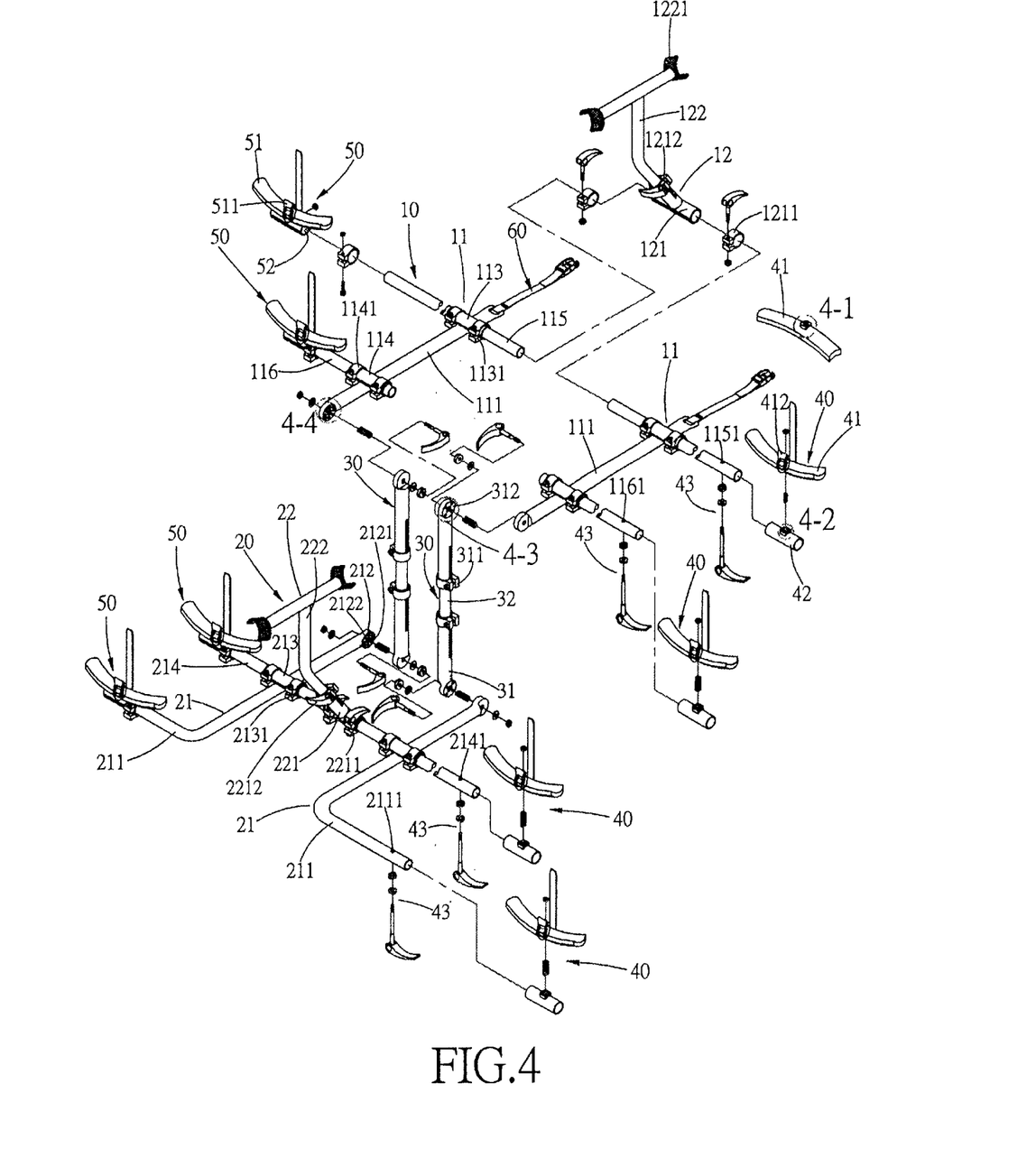

Please refer to FIG. 4, the first preferred embodiment of the present invention provides a support assembly mainly comprising a first frame member 10, a second frame member 20, two retractable tube sets 30, four front wheel seats 40 and four rear wheel seats 50, wherein The first frame member 30 mainly consists of two frame tubes 11 and a support frame 12. Each frame tube 11 has a main tube 111, a belt 60 fastened at a front end of the main tube 111 and a rotating seat 112 at a rear end of the main tube 111. The rotating seat 112 has a through hold 1121 at center thereof and eight recesses 1122 around the through hole 1121. Each main tube 111 further fixes two transverse tubes 113 and 114 thereon. Each transverse tube 113 and 114 provides two fastening rings 1131 respectively at opposite ends thereof. The transverse tube 113 is engaged with a long bar 115 and the other one transverse tube 114 is engaged with a short bar 116. The long bar 115 and the short bar 116 each is provided with a through hole 1151 and 1161 respectively. The support frame 12 has a T-shaped base tube 121, two quick fastening rings 1211 provided at opposite ends of the base tube 121 respectively and a movable support tube 122 fastened to the third end of the base tube 121 by a fastening ring 1212. The support tube 122, which is T shape too, provides two support seats 1221 respectively at opposite ends thereof.

The second frame member 20, similarly, mainly consists of two L-shaped frame tubes 21 and a support frame 22. Each frame tube 21 has a main tube 211 and a rotating seat 212 fastened at a front end of the main tube 211. The rotating seat 212 has a through hole 2121 at center thereof and eight recesses 2122 around the through hole 2121. A transverse tube 213 crosses the frame tubes 21 and fastens thereto. The transverse tube 213 is fastened with two fastening rings 2131 at opposite ends thereof. A transverse bar 214 is inserted into the transverse tube 213. The main tube 211 and the transverse bar 214 each is provided with a through hole 21111, and 2141 respectively. The support frame 22 has a T-shaped base tube 221, two quick fastening rings 2211 provided at opposite ends of the base tube 221 respectively and a movable support tube 222 fastened to the third end of the base tube 221 by a fastening ring 2212. The support tube 222, which is T shape too, provides two support seats 2221 respectively at opposite ends thereof.

The retractable tube set 30 has two outer tubes 31 and an inner tube 32 with opposite ends thereof inserted into the outer tubes 31. Each outer tube 31 is provided with a fastening ring 311 at a proximal end thereof and rotating seat 312 at a distal end thereof. Each rotating seat 312 has a through hole 3121 at center thereof and four plugs 3122 around the through hole 3121.

The front wheel seat 40 consists of a curved base seat 41, a round tube 42 and a fastening device 43. The base seat 41 is provided with a rotating seat 411 at a bottom side thereof. The rotating seat 411 has two plugs 4111 at a bottom side thereof, a through hole 4112 at center and a fastening device 412. The round tube 42 is provided with a rotating seat 421 with six recesses 4211 at a top side thereof and a through hole 4212 at center.

The rear wheel seat 50 has a curved base seat 51, an adjusting tube 52 fixed at a bottom side of the base seat 51 and a fastening device 511 at center of the base seat 51. The adjusting tube 52 has a slot.

Figure 5:
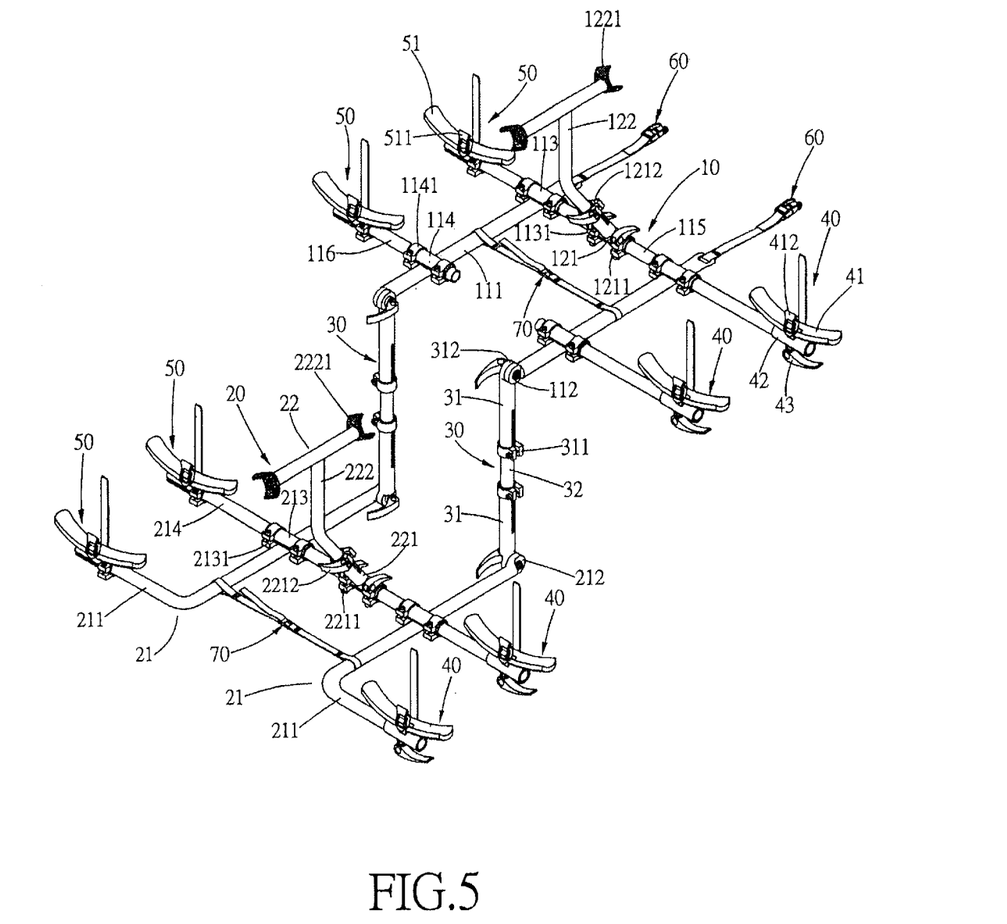
FIG. 5 is a perspective view of the first preferred embodiment of the present invention.

In assembling, please refer to FIG. 5, the round tubes 42 of the front wheel seats 40 respectively engages with the transverse tubes 115 and 116 of the first frame member 10 and the frame tube 211 and transverse bar 214 of the second frame 20. The base seats 41 of the front wheel seats 40 are attached to the round tubes 42 respectively for engagement of the plugs 4111 on the rotating seat 411 of the base seats 41 with the recesses 4121 on the rotating seat 421 of the round tubes 42. The fastening devices 43 are inserted into, from bottom to top, the through holes 1151, 1161, 2141 and 2111 on the transverse tube 113, 114 and 214 and the frame tube 211 and the through holes 4112 of the base seats 411 to fasten the round tubes 42. The adjusting tubes 52 of the rear wheel seats 50 respectively are engaged with the transverse tubes 113 and 114 of the frame tube 11 of the first frame 10 and the L-shaped main tube 211 the transverse tube 214 of the second frame 20 with fastening rings meshed with the slots on the lateral sides of the adjusting tubes 52. The long bars 115 of the frame tubes 11 of the first frame 10 is inserted into the opposite ends of the base tubes 121 of the support frame 12 and fastened by the quick fastening rings 1211 meshed with the slots the lateral sides. The transverse tubes 214 of the frame tubes 21 of the second frame 20 inserts their inner ends into the opposite ends of the base tube 221 of the support frame 22 and are fastened by the quick fastening rings 2211 meshed with the slots the lateral sides. The rotating seats 312 of the outer tubes 31 of the retractable tube sets 30 are attached to the rotating seats 112 and 212 of the first frame member 10 and the second frame member 20 respectively with which the plugs 3122 on the rotating seats 312 mesh the recesses 1122 and 2122 on the rotating seats 112 and 212. A quick fastening ring is inserted into the through holes 3121, 1121 and 2121 on the rotating seats 312 of the outer tubes 31 of the retractable tube sets 30 and the rotating seats 112 and 212 of the first frame member 10 and the second frame member 20 to fasten them. Finally, fasten the belts 70 to the frame tube 11 and 12 of the first frame member 10 and the second frame member 20.

Figure 6:
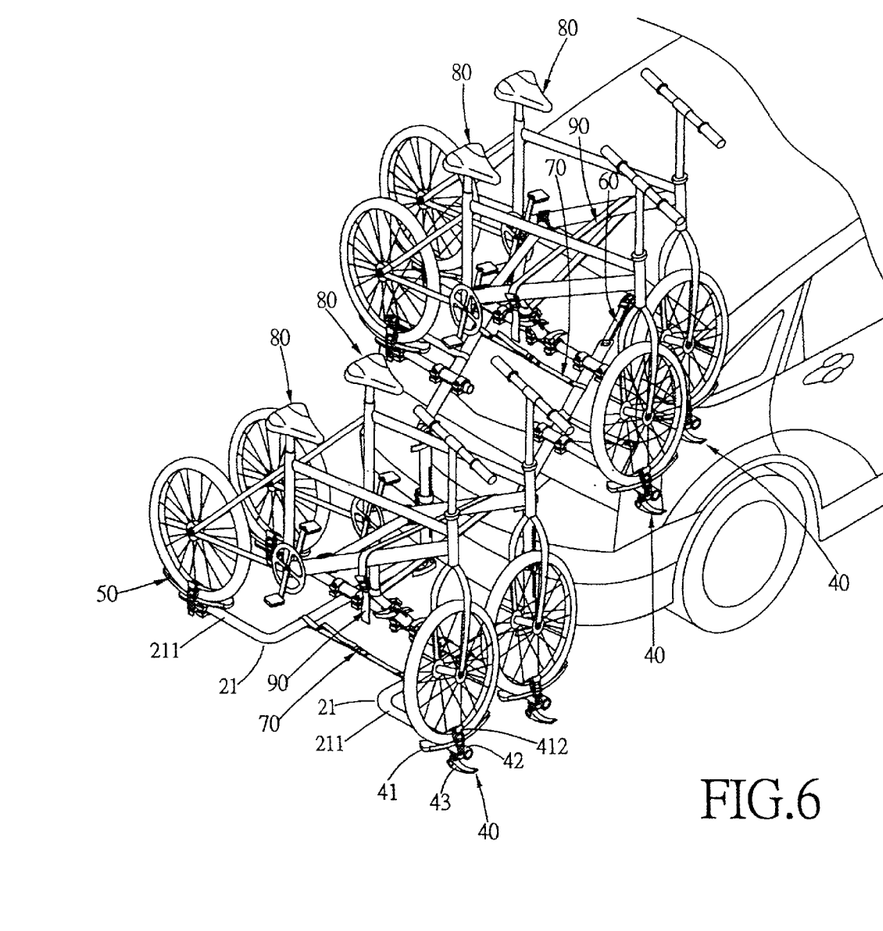
FIG. 6 is a perspective view, showing the support assembly of the first preferred embodiment of the present invention mounted on a five-door car.
Figure 7:
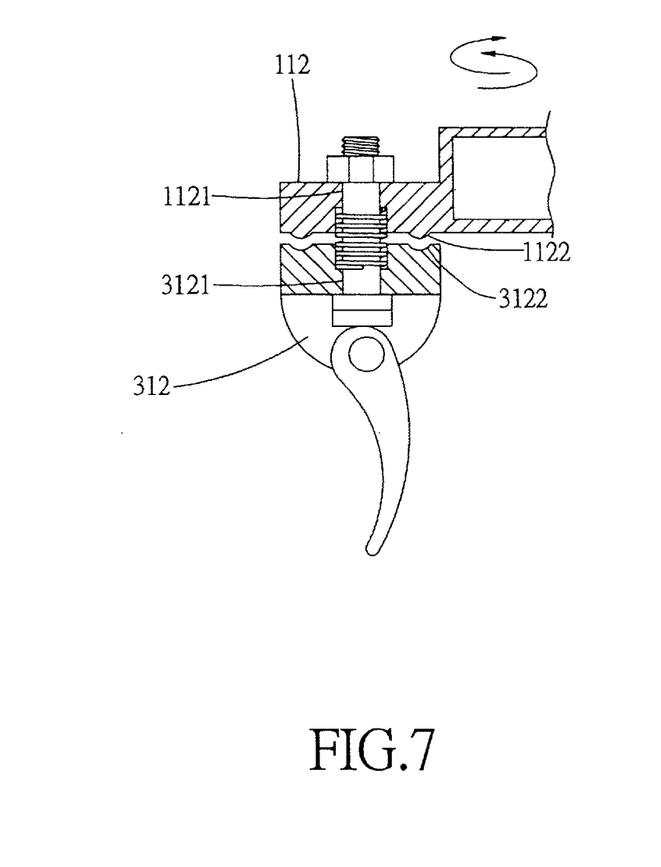
FIG. 7 is a perspective view, showing the support assembly of the first preferred embodiment of the present invention being turned.
Figure 8:
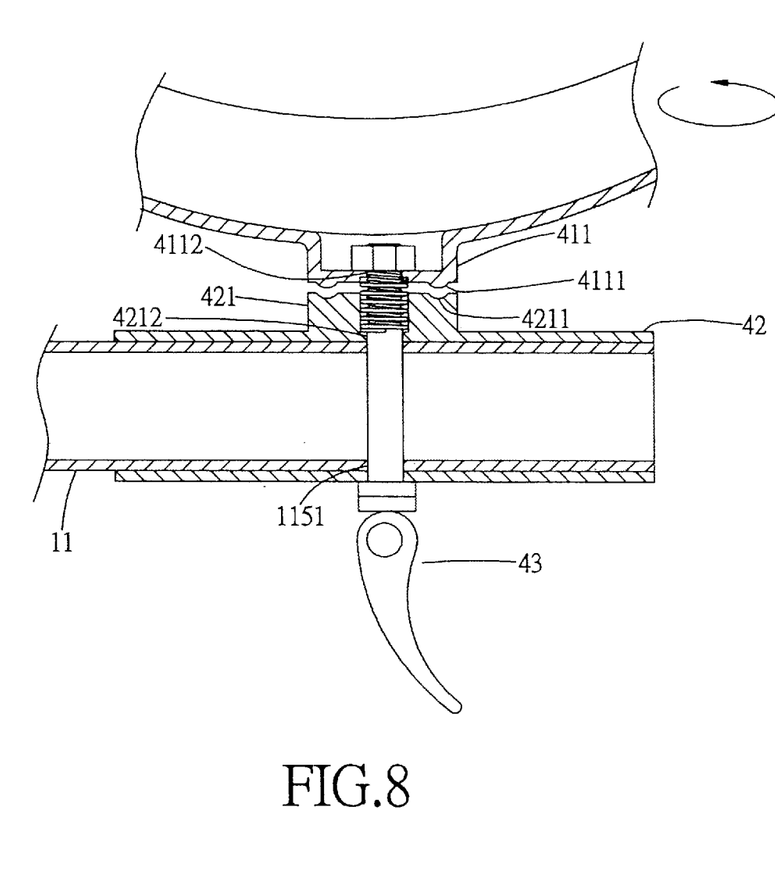
FIG. 8 is a perspective view, showing a front wheel seat of the support assembly of the first preferred embodiment of the present invention being turned.
Figure 9:
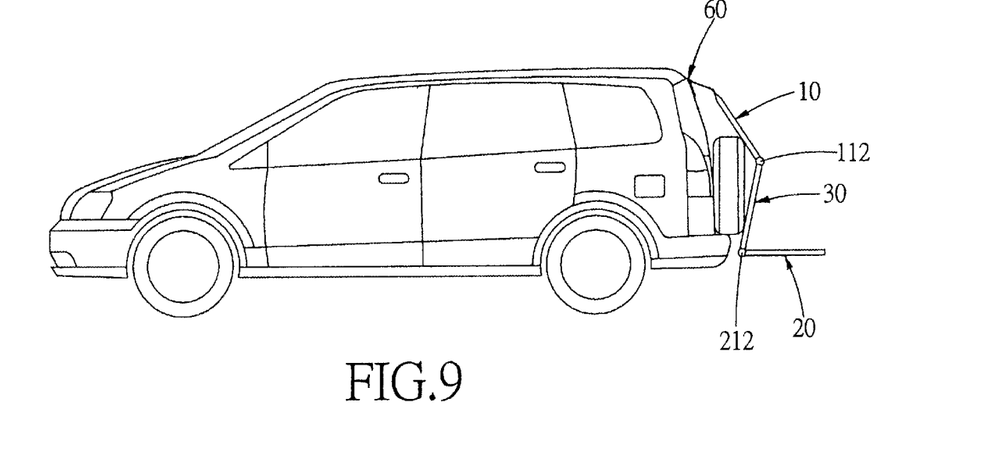
FIG. 9 is a perspective view, showing the support assembly of the first preferred embodiment of the present invention mounted on a recreation vehicle.
Figure 10:
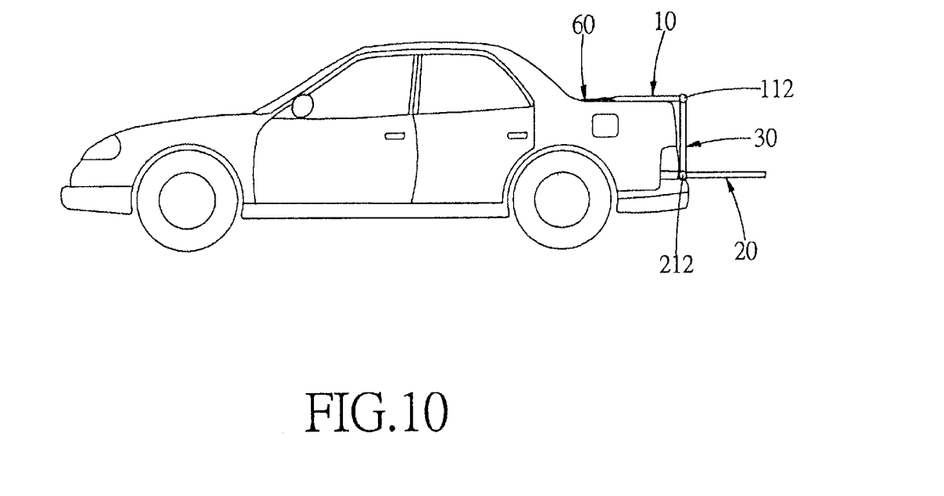
FIG. 10 is a perspective view, showing the support assembly of the first preferred embodiment of the present invention mounted on a four-door car.
Figure 11:
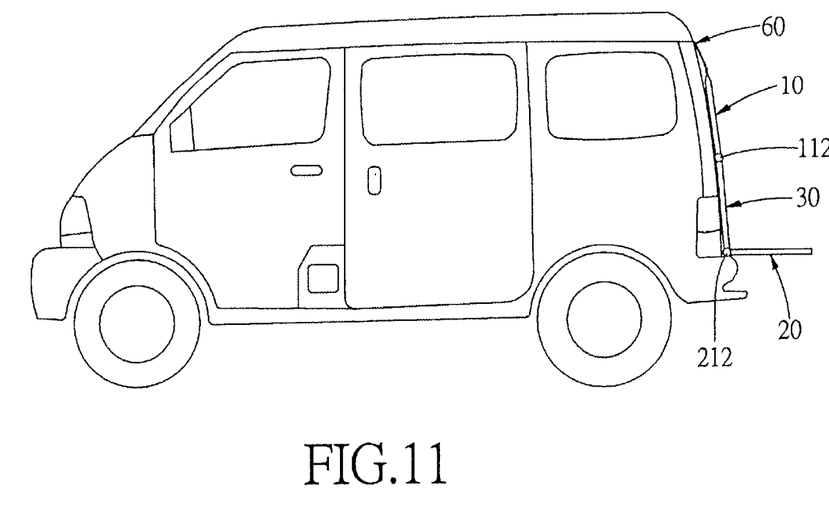
FIG. 11 is a perspective view, showing the support assembly of the first preferred embodiment of the present invention mounted on a van.

When mount the support assembly of the present invention on a bevel-back car to carry bicycles 80, please refer to FIG. 6 and FIG. 7, first, loose the quick fastening ring between the retractable tube sets 30 and the first frame member 10 to make the plugs 3122 on the rotating seat 312 of the retractable tube sets 30 unmeshed the recesses 1122 on the rotating seat 112 of the first frame member 10 such that one can turn the retractable tube sets 30 to a predetermined angle, and then fasten the quick fastening ring again to secure the retractable tube sets 30 (the plugs 3122 with mesh with another recesses 1122). The belts 60 now are fastened to the back of the car and the transverse tubes 115 and 116 and the support frame 12 of the first frame member 10 is turned to specific angles respectively to meet the bicycles being carried and respectively adjust the front wheel seats 40 to suitable positions and adjust the length of the rectangular tube sets 30. Now one can put four bicycles 80 on the support assembly of the present invention with front wheels of the bicycles 80 resting on the curved base seats 41 of the front wheel seats 40 respectively and fastened thereto by the fastening devices 412 and with rear wheels thereof resting on the curved base seats 51 of the rear wheel seats 50 respectively and fastened thereto by fastening devices 511. The support seats 1221 and 2221 of the support tubes 122 and 222 rest against the bicycles 80 respectively and the belts 90 wind the bicycles 80 to fasten them. Finally, please refer to FIG. 8, loose the quick fastening rings 43 of the front wheel seats 40 to turn the base seats 41 and then fasten the quick fastening rings 43 again (the plugs 4111 and the recesses 4211 on the front wheel seats 40 work as same as the plugs 3122 and the recesses 1122 of the retractable tube sets 30 and the first frame 10 do). Thus, the bicycles 80 are secured on the support assembly of the present invention and the front wheels of the bicycles 80 are turned about 90 degrees to shorten the lengths of the bicycles 80 being carried on the car.

Figure 12:
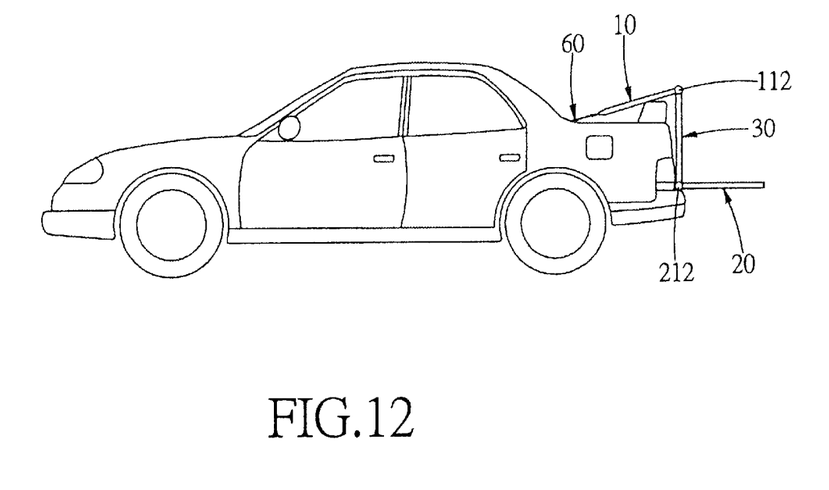
FIG. 12 is a perspective view, showing the support assembly of the first preferred embodiment of the present invention mounted on a vehicle with a flow board on the rear thereof.

Please refer to FIGS. from FIG. 9 to FIG. 12, which show the support frame of the present invention mounted on a RV (FIG. 9), a four-door car (FIG. 10), a van (FIG. 11) and a car with flow board at rear (FIG. 12). All we need are adjusting the lengths of the retractable tube sets 30 and the angles between the first frame member 10 and the retractable tube sets 30 and the angles between the second frame member 20 and the retractable tube sets 30.

To disassemble the support assembly of the present invention from the vehicle, user has to disassemble the frame tubes 11 and 21 and the support tubes 12 and 22 of the first and the second frame members 10 and 20 and loose the quick fastening rings between the first and the second frame members 10 and 20 and the retractable tube sets 30 to fold them up and fasten the quick fastening rings again, such that the support assembly of the present invention is disassembled and folded for facilitation of storage.

If user only has one or two bicycles needed to be carried on a vehicle, user can disassemble the retractable tube sets 30 and the second frame member 20 and only mount the first frame member 10 of the support assembly of the present invention on the vehicle.

Figure 13:
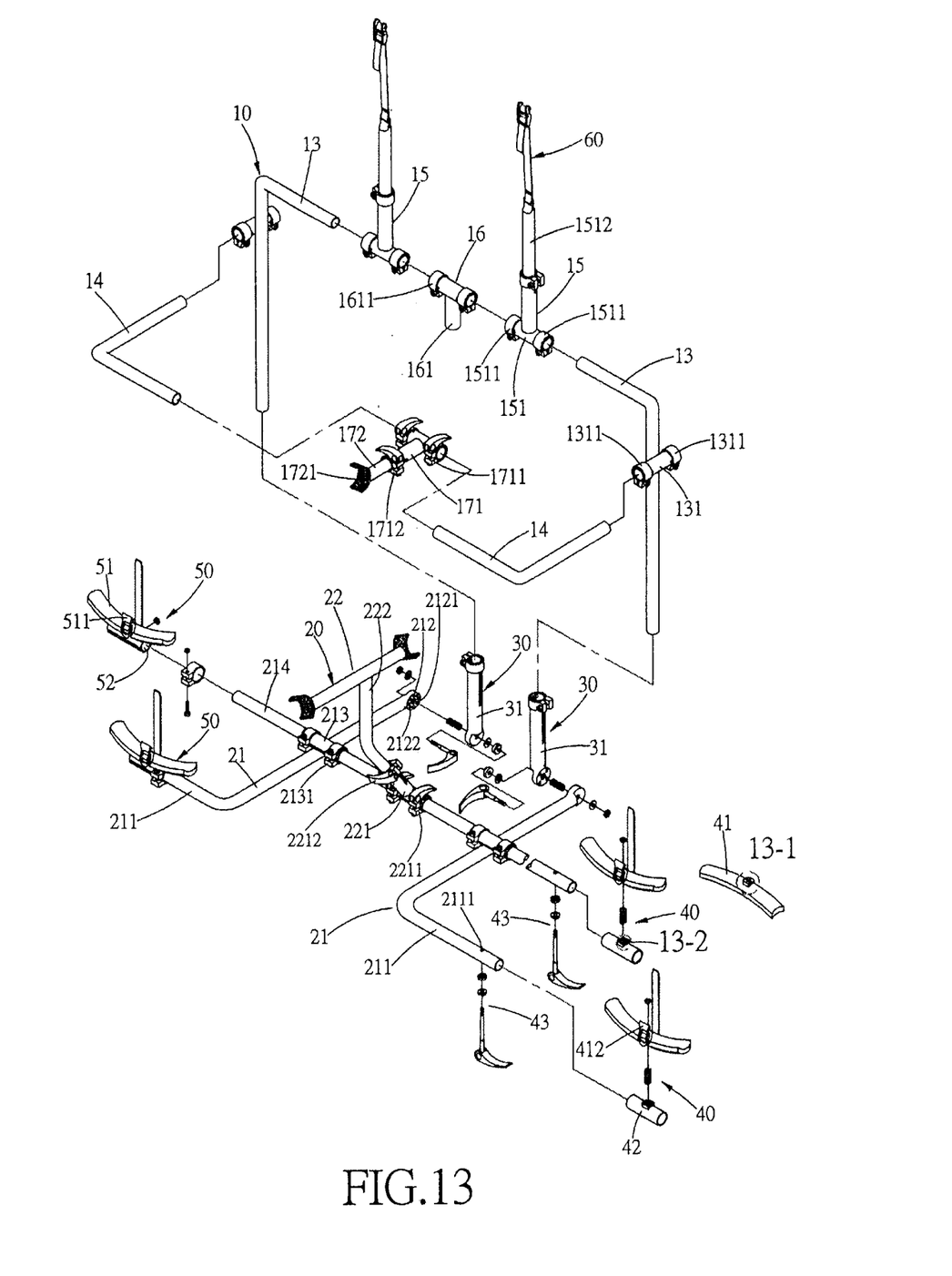

FIG. 13 shows a support frame of the second preferred embodiment of the present invention, which a first frame member 10 has two L-shaped vertical tubes 13, two L-shaped transverse tubes 14, two hanging frames 15, a connection frame 16 and a support frame 17, wherein each vertical tube 13 fixes a connection tube 131 with a fastening ring 1311 thereon at each end thereof, the hanging frame 15 has a T-shaped base tube 151 which provide two fastening rings 1511 respectively at opposite ends thereof and provide a hanging tube 1512 with a hanging belt 60 thereon at the third end thereof, the connection frame 16 has a T tube 161 with two fastening rings 1611 respectively at opposite ends thereof and the support frame 17 has a T-shaped base tube 171 with two quick fastening rings 1711 respectively at opposite ends thereof and a support tube 172 inserted into the third end thereof fastened by a quick fastening ring 1712 at which opposite ends respectively are provided with a support seat 1721.

Figure 14:
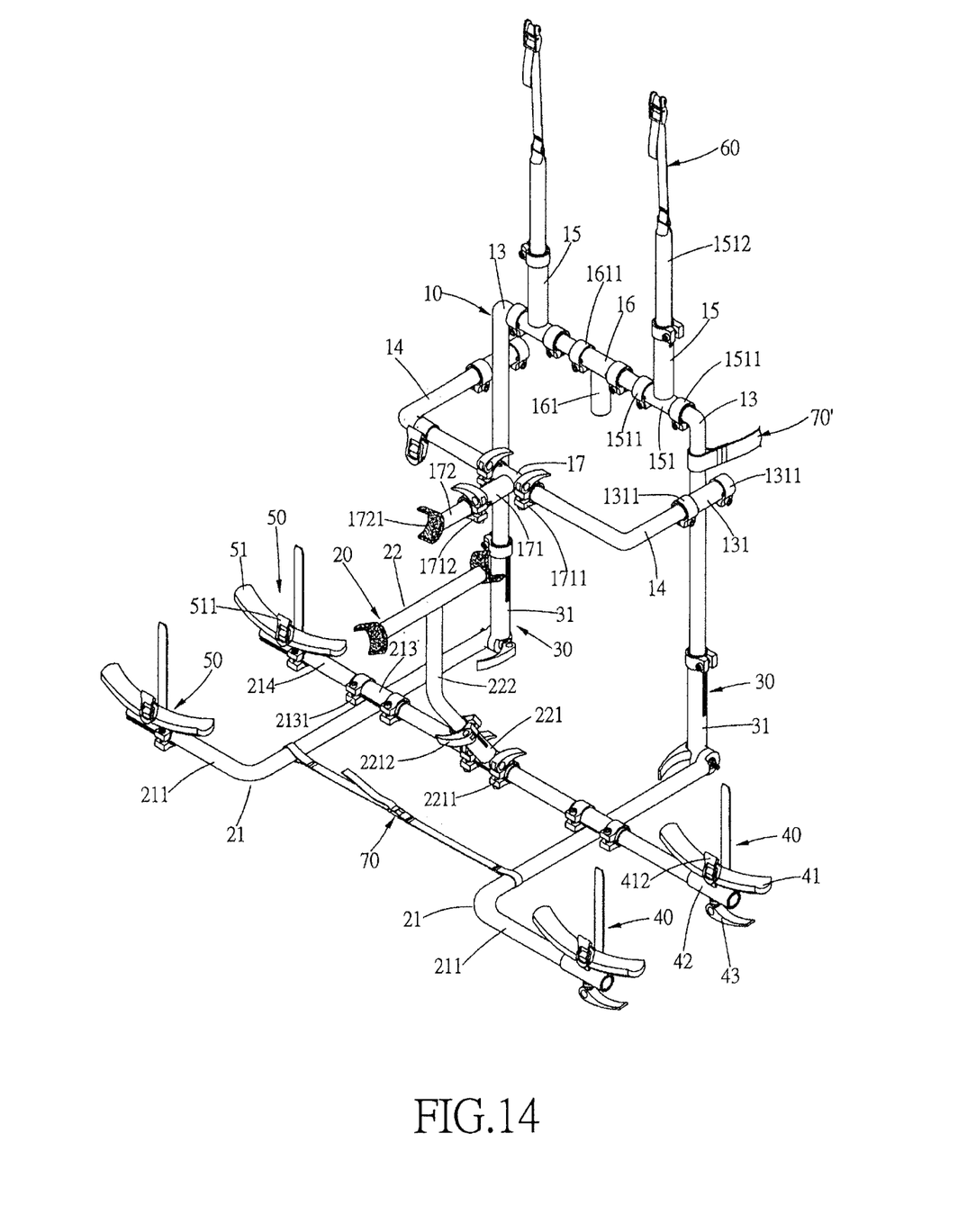
FIG. 14 is a perspective view of the second preferred embodiment of the present invention.

To assembly, please refer to FIG. 14, insert ends of the vertical tubes 13 through the base tubes 151 of the hanging frames 151 and into the T tube 161 of the connection frame 16 respectively and secure them by the fastening rings 1511. Insert ends of the transverse tubes 14 into the opposite ends of the base tube 171 of the support frame 17 and fasten them by the quick fastening rings 1711 and insert the other ends of the transverse tubes 14 into the connection tubes 131 of the vertical tubes 13 and fasten them by fastening rings 1311 respectively. Mount outer tubes 31 of two retractable tube sets 30, two front wheel seats 40 and two rear wheel seats 50 on a second frame member 20 as the first preferred embodiment did. Insert the other ends of the vertical tubes 13 into the distal ends of outer tubes 31 of the retractable tube sets 30 and fasten them by fastening rings 311 respectively. At last, fasten two belts 70 to two frame tubes 11 and 21 and fasten opposite ends of a fastening belt 70' respectively to the vertical and the transverse tubes 13 and 14.

Figure 15:
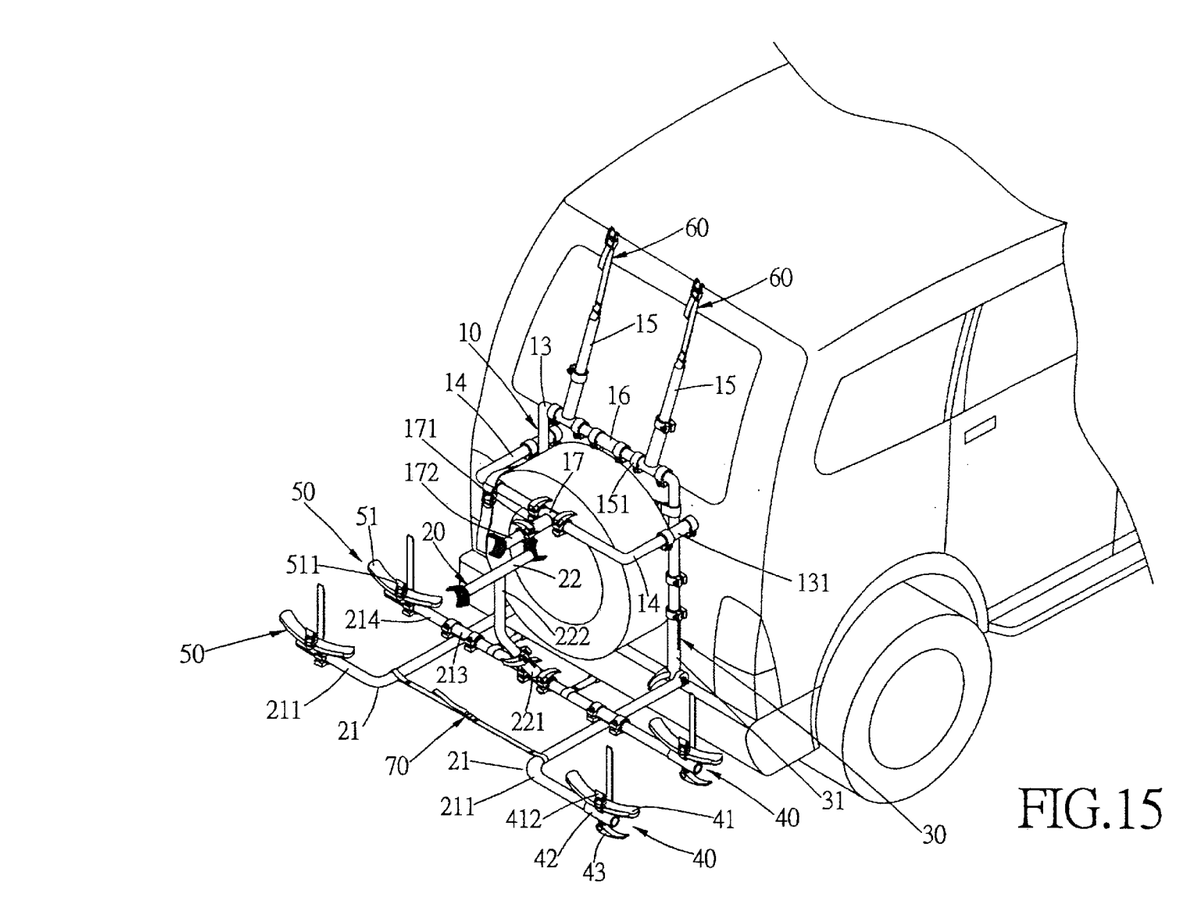
FIG. 15 is a perspective view, showing the support assembly of the second preferred embodiment of the present invention mounted on a vehicle.
Figure 41:
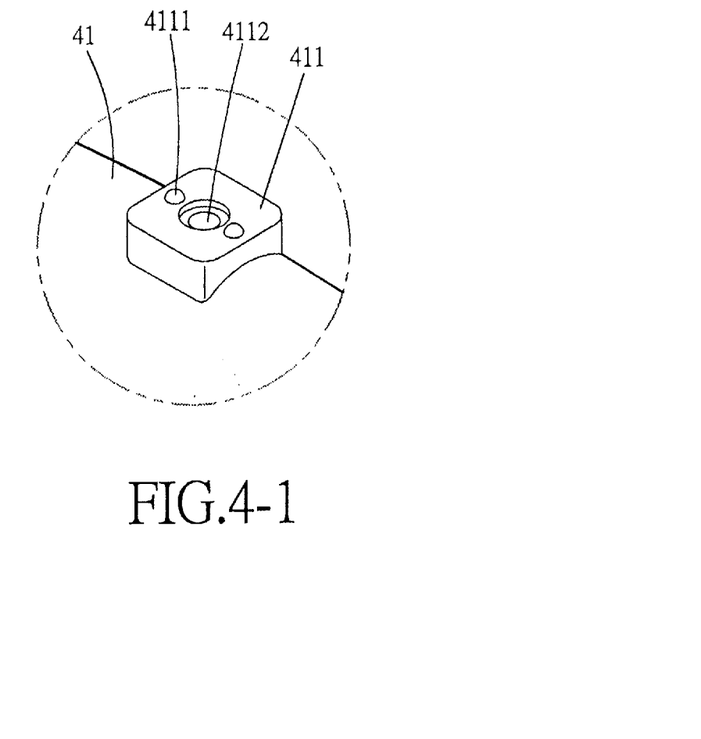
Figure 42:
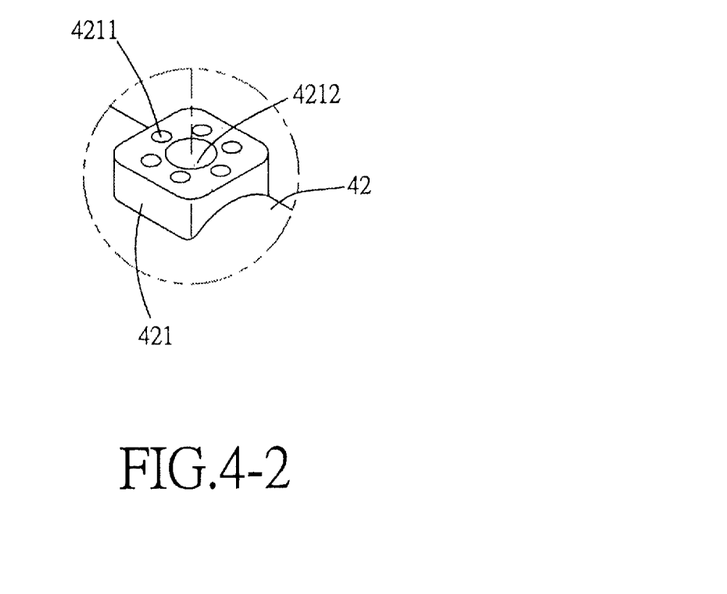
Figure 43:
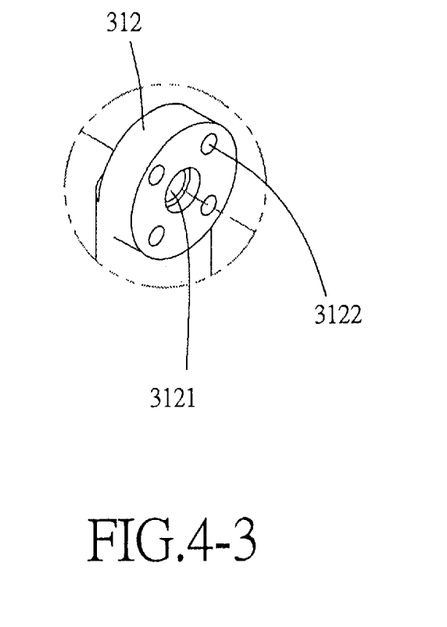
Figure 44:
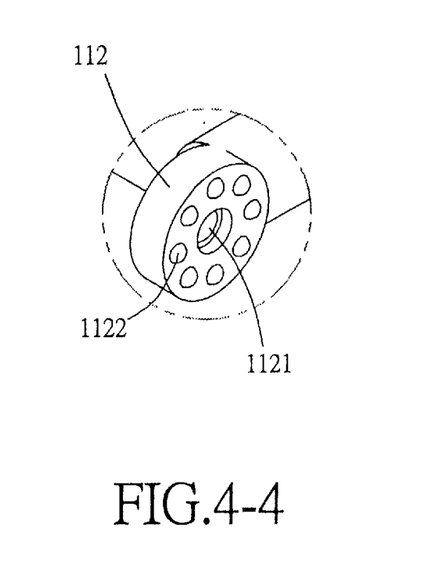
Figure 131:
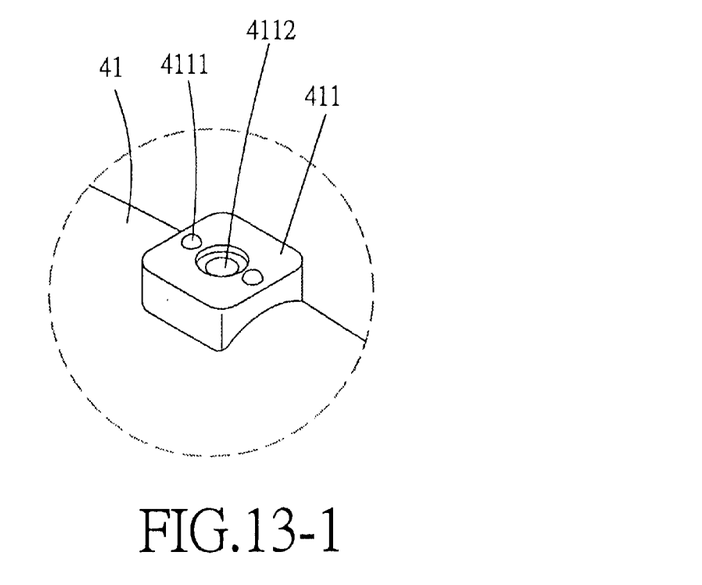
Figure 132:
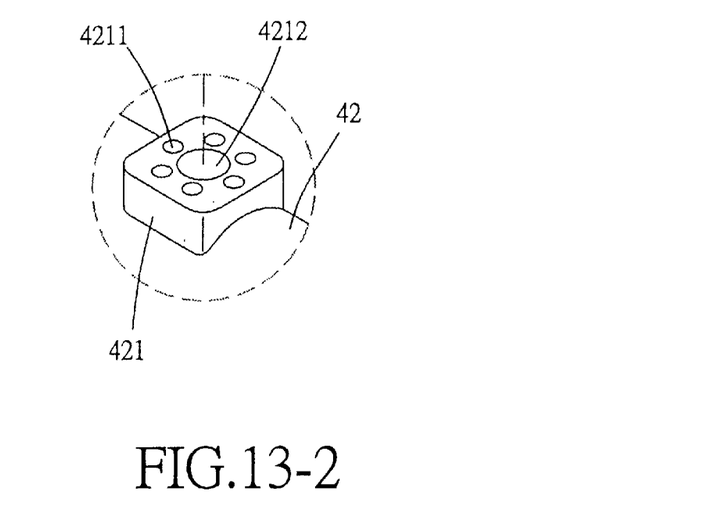

Please refer to FIG. 15, to mount the support assembly of the second preferred embodiment of the present invention on a RV, first fasten the hanging belt 60 to the rear of the RV to locate the vertical and the transverse tubes 13 and 14 around a spare tire on the RV and make the T tube 161 of the connection frame 16 against the spare tire at an interior side thereof and wind the fastening belt 70' around the spare tire and fasten thereto. Adjust the positions of the second frame member 20 and the front wheel seats 30 according to bicycles 80 and the vehicle to put and secure the wheels of the bicycles 80 on the base seats 41 and 51 of the front wheel seats 40 and rear wheel seats 50 and rest the support seats 172 of the support frame 17 against top tubes of the bicycles 80 and rest the support seats 2221 of the T-shaped support tubes 17 against bottom tubes of the bicycles 80 respectively. At last, wind the belt 90 around the bicycles 80 to fasten them and turn the front wheel seats 80, as described above, about 90 degrees. Such that the bicycles 80 will be secured on the support frame of the present invention with shorter lengths.

The advantages of the present invention are:

1. The lengths of the bicycles 80 secured on the support assembly of the present invention can be shortened by turning the front wheel seats 40 such that when carrying the bicycles on a vehicle will be safer to drive.

2. The support assembly of the present invention can be mounted on any type of vehicle, such as van, RV or car with flow board etc.

3. The bicycles 80 are fixedly secured by the support frames 12 and 22 against the bicycles, the belts 90 winded around and the fastening devices 412 and 511 on the base seats 41 and 51 of the wheel seats 40 and 50 so that the bicycles 80 will not escape from the support assembly of the present invention even when the vehicle is driving on a rough road.

What is claimed is:

1. A support assembly, which is mounted on a vehicle for carrying bicycles thereon, comprising:

a first frame member having two parallel frame tubes and a support frame provided at between said frame tubes and connecting opposite ends thereof to said frame tubes respectively, wherein each of said frame tubes has a main tube which provides a through hole at a front end thereof with a belt fastened therein and a rotating seat at a rear end thereof, said rotating seat has a through hole and a plurality of recesses around said through hole, said frame tube is provided with two transverse tubes in parallel and a long bar and a short bar jointed with said transverse tubes respectively, said long bar and said short bar of one of said frame tube are respectively provided with a vertical through hole at a distal end thereof, and said support frame has a T-shaped base tube jointed with a T-shaped support tube;

a second frame member having two parallel frame tubes and a support frame provided at between said frame tubes and connecting opposite ends thereof to said frame tubes respectively, wherein each of said frame tubes has a L-shaped main tube and a rotating seat fixed at a front end of said main tube, said rotating seat has a through hole and a plurality of plugs around said through hole, said frame tube is provided with a transverse tube at a midsection thereof and joint a transverse bar to said transverse tube, said L-shaped main tube and said transverse bar of one of said frame tube are respectively provided with a vertical through hole at a distal end thereof, and said support frame has a T-shaped base tube jointed with a movable T-shaped support tube;

two retractable tube sets, each of which has two outer tubes and a inner tube jointed together and two rotating seats fixed on said outer tubes respectively, wherein said rotating seat has a through hole and a plurality of plugs around said through hole;

whereby ends of said retractable tube sets connect said first frame member and said second frame member respectively so that angles between said first frame member, said second frame member and said retractable tube sets and a distance between said first frame member and said second frame member can be adjusted;

four front wheel seats, each of which has a curved base seat, a round tube and a quick fastening ring, wherein said base seat is provided with a rotating seat at a bottom side thereof, which has a through hole and a plurality of recesses around said through hole, a fastening device at a midsection thereof and a slot at a side thereof, and said round tube is provided with a rotating seat at a top side thereof, which has a through hole and a plurality of plugs around said through hole;

whereby said round tubes of said front wheel seats respectively joint distal ends of two transverse tubes on one of said frame tubes of said first frame member and a distal end of said L-shaped main tube and an end of said transverse tube of said second frame member and said base seats of said front wheel seats are attached on said round tube respectively and fastened thereon by said quick fastened rings, and four rear wheel seats, each of which has a curved base seat, an adjusting tube fixed at a bottom side of said base seat, a fastening device fixed at a lateral side of said base seat and a slot provided at said adjusting tube;

whereby said adjusting tubes of said rear wheel seats respectively joint distal ends of said transverse tubes on another one of said frame tubes of said first member and distal end of L-shaped main tube of the other one of said frame tubes and the other end of said transverse tube of said second frame member;

whereby the bicycles' rear wheels can be put and secured on said base seats of said rear wheel seats and the bicycles' rear wheels can be put and secured on said base seats of said front wheel seats and said base seats of said front wheel seats can be turned to shorten the lengths of the bicycle secured thereon.

2. According to the support assembly of claim 1, wherein it can be only mount said first frame member on the vehicle.

3. A support assembly, which is mounted on a vehicle for carrying bicycles thereon, comprising:

a first frame member having two L-shaped vertical tubes, two L-shaped transverse tubes, two hanging frames, a connection frame and a support frame, wherein said hanging frames joint ends of said vertical tubes respectively and are secured by fastened rings, said connection frame connects said hanging frames, said support frame connects ends of said transverse tubes and each of said vertical tubes are provided with a connection tube for connecting the other ends of said transverse tubes respectively;

a second frame member having two parallel frame tubes and a support frame provided at between said frame tubes and connecting opposite ends thereof to said frame tubes respectively, wherein each of said frame tubes has a L-shaped main tube and a rotating seat fixed at a front end of said main tube, said rotating seat has a through hole and a plurality of plugs around said through hole, said frame tube is provided with a transverse tube at a midsection thereof and joint a transverse bar to said transverse tube, said L-shaped main tube and said transverse bar of one of said frame tube are respectively provided with a vertical through hole at a distal end thereof, and said support frame has a T-shaped base tube jointed with a movable T-shaped support tube;

two retractable tube sets, each of which has two outer tubes and a inner tube jointed together and two rotating seats fixed on said outer tubes respectively, wherein said rotating seat has a through hole and a plurality of plugs around said through hole;

whereby ends of said retractable tube sets connect said first frame member and said second frame member respectively so that angles between said first frame member, said second frame member and said retractable tube sets and a distance between said first frame member and said second frame member can be adjusted;

four front wheel seats, each of which has a curved base seat, a round tube and a quick fastening ring, wherein said base seat is provided with a rotating seat at a bottom side thereof, which has a through hole and a plurality of recesses around said through hole, a fastening device at a midsection thereof and a slot at a side thereof, and said round tube is provided with a rotating seat at a top side thereof, which has a through hole and a plurality of plugs around said through hole;

whereby said round tubes of said front wheel seats respectively joint ends of said transverse tubes of said first frame member and a distal end of said L-shaped main tube and an end of said transverse tube of said second frame member and said base seats of said front wheel seats are attached on said round tube respectively and fastened thereon by said quick fastened rings, and four rear wheel seats, each of which has a curved base seat, an adjusting tube fixed at a bottom side of said base seat, a fastening device fixed at a lateral side of said base seat and a slot provided at said adjusting tube;

whereby said adjusting tubes of said rear wheel seats respectively joint another ends of said transverse tubes of said first member and distal end of L-shaped main tube of the other one of said frame tubes and the other end of said transverse tube of said second frame member;

whereby the bicycles' rear wheels can be put and secured on said base seats of said rear wheel seats and the bicycles' rear wheels can be put and secured on said base seats of said front wheel seats and said base seats of said front wheel seats can be turned to shorten the lengths of the bicycle secured thereon.

* * * * *